Jan. 8, 1957  J. E. WILLIAMS  2,776,583
DRIVE MECHANISM FOR CROP HARVESTING VEHICLES
Filed April 5, 1954  8 Sheets-Sheet 1
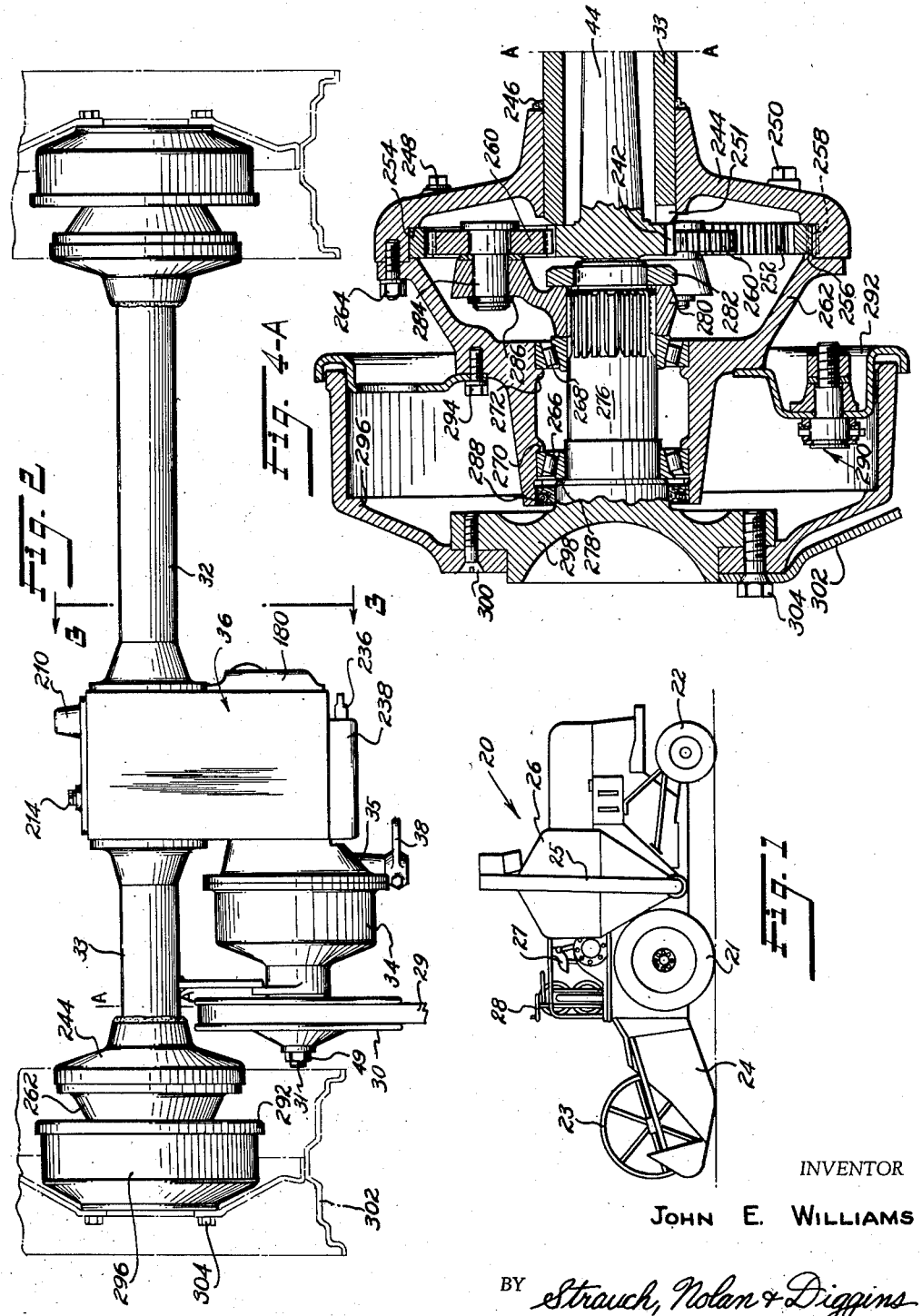
INVENTOR
JOHN E. WILLIAMS
BY *Strauch, Nolan & Diggins*
ATTORNEYS

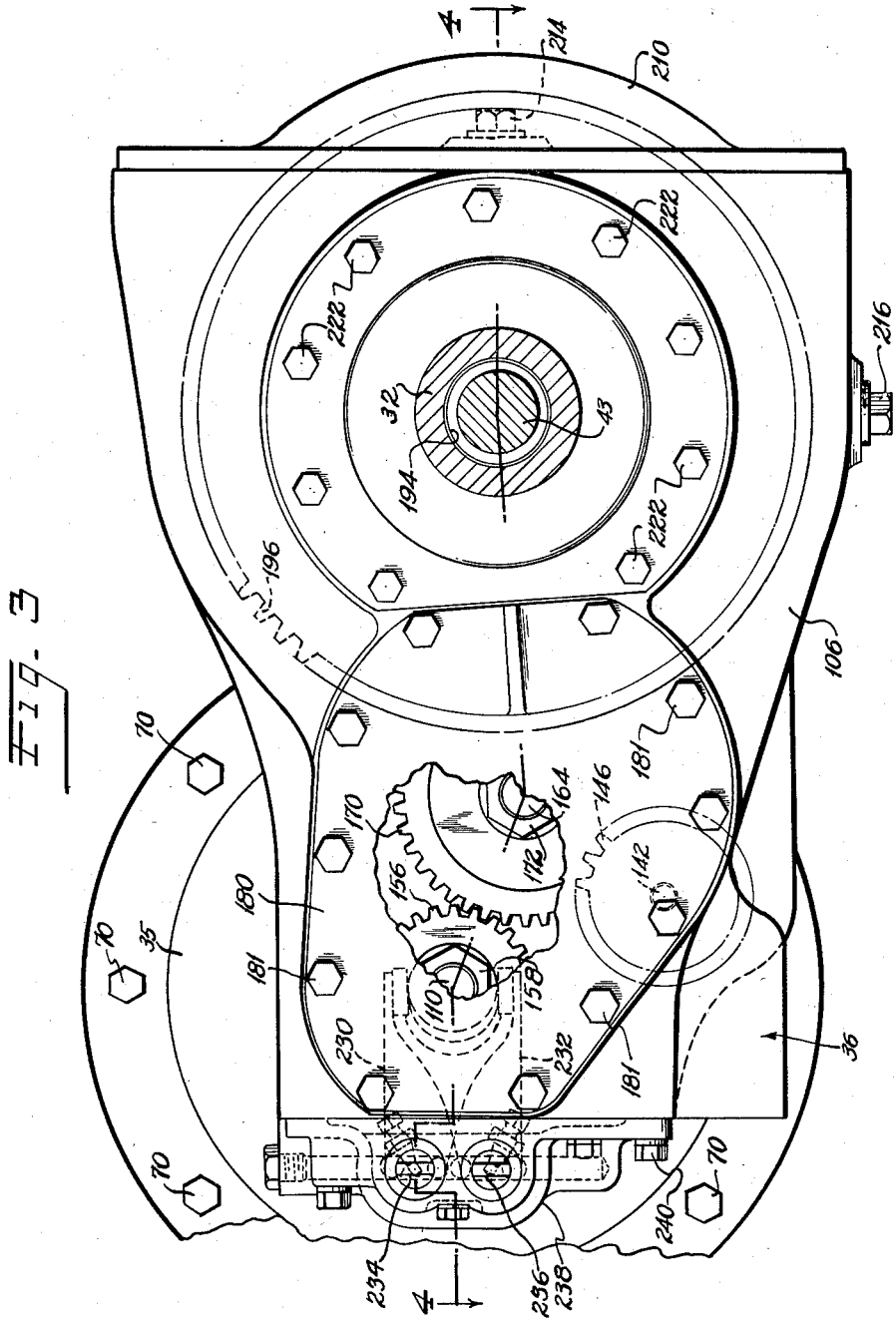

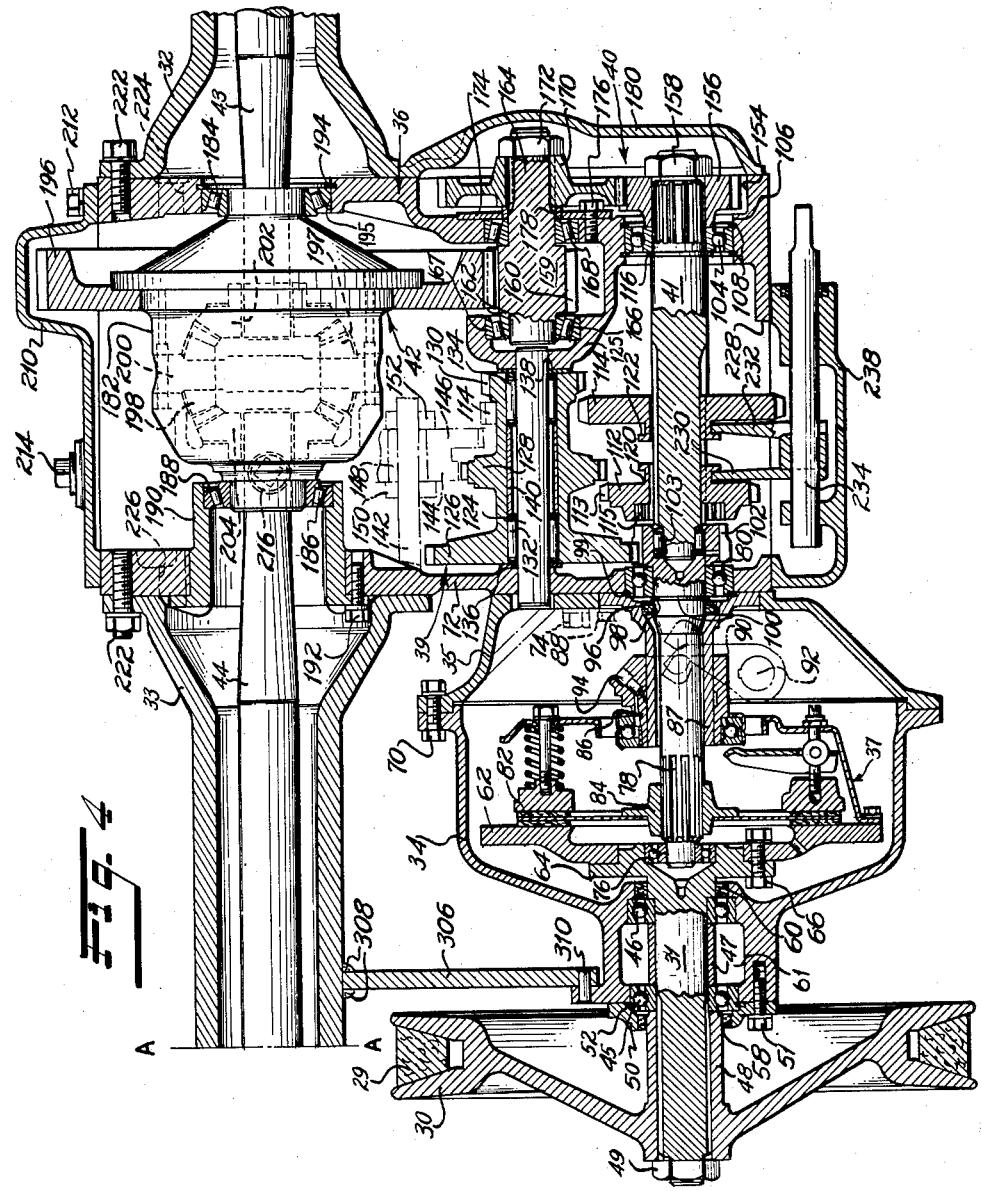

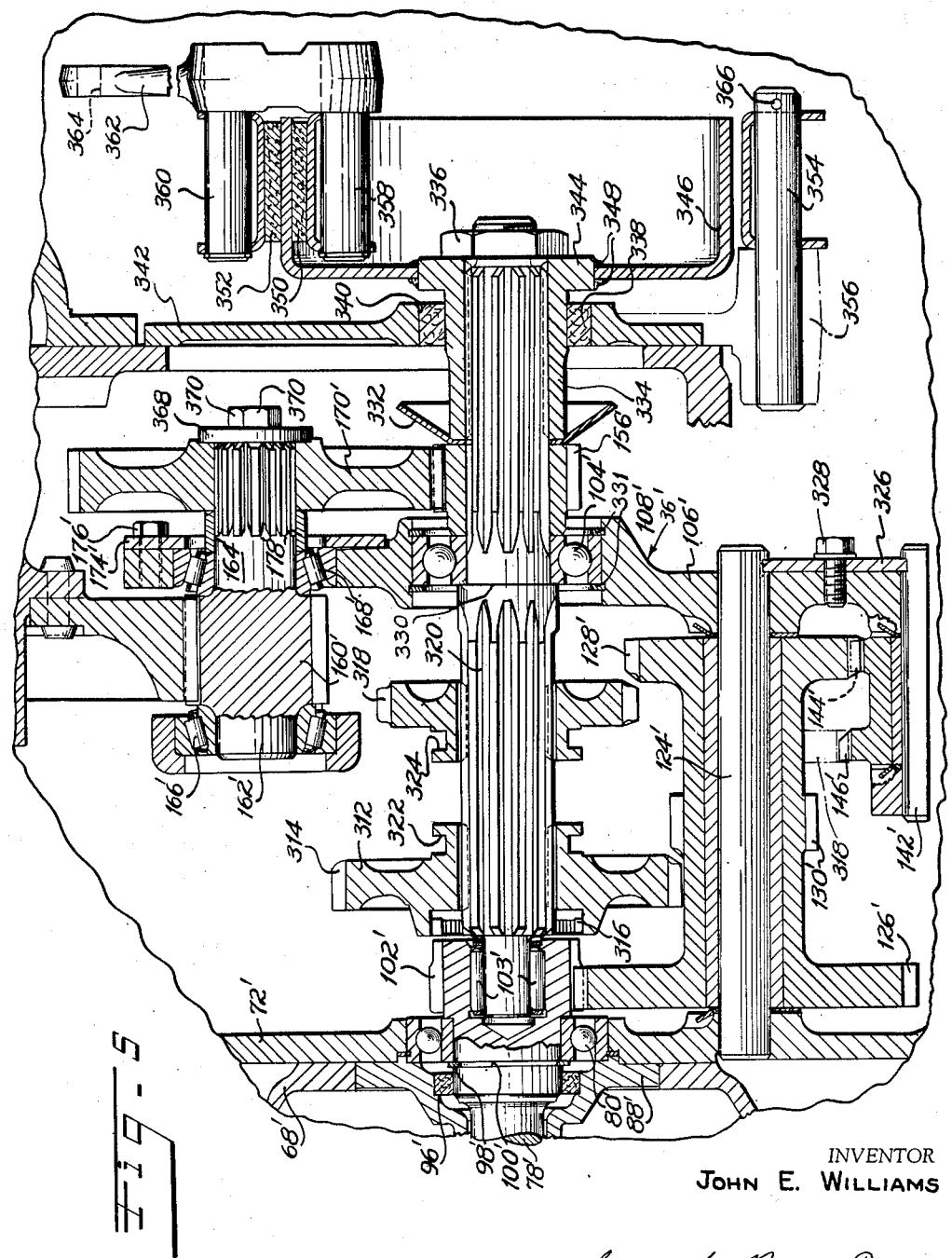

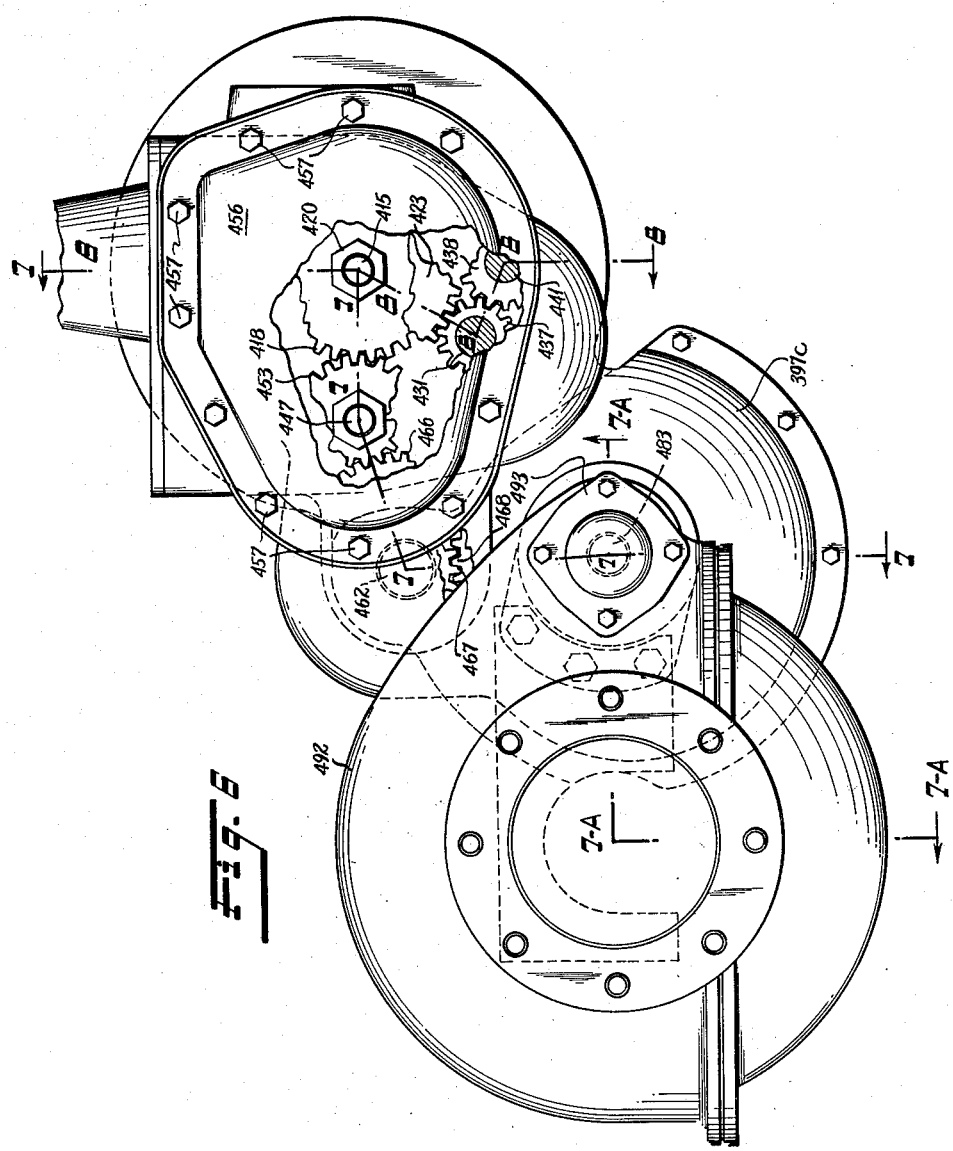

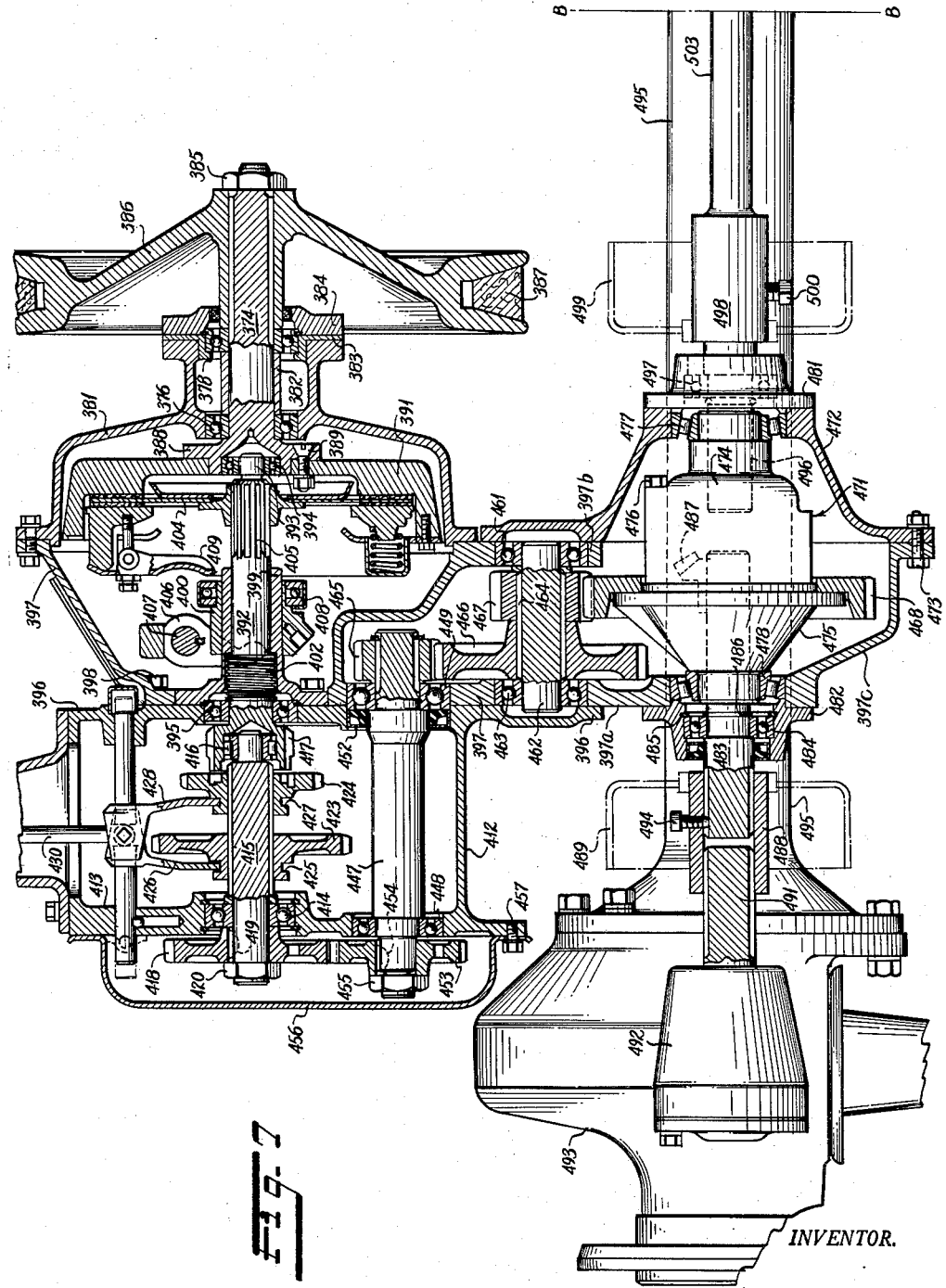

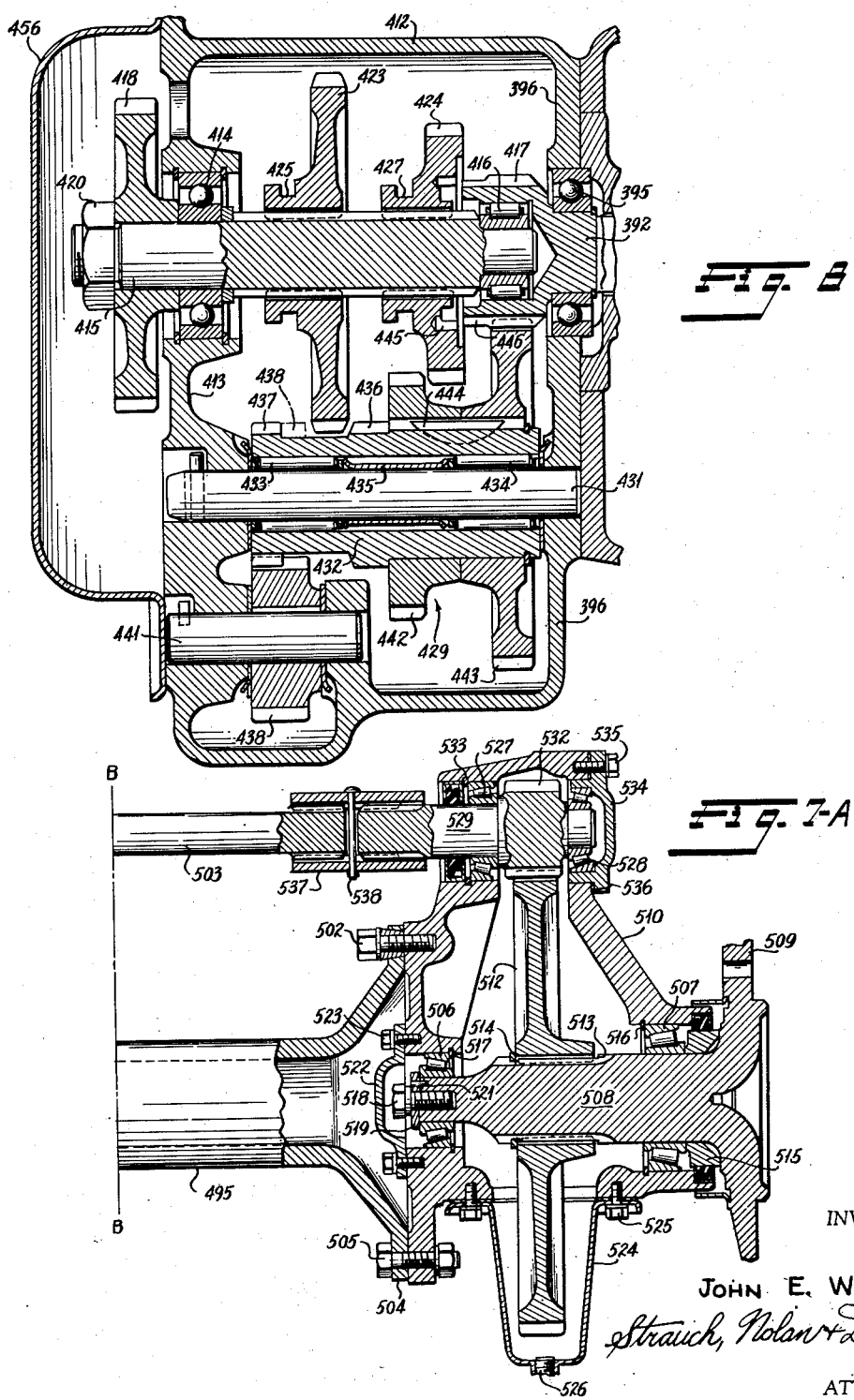

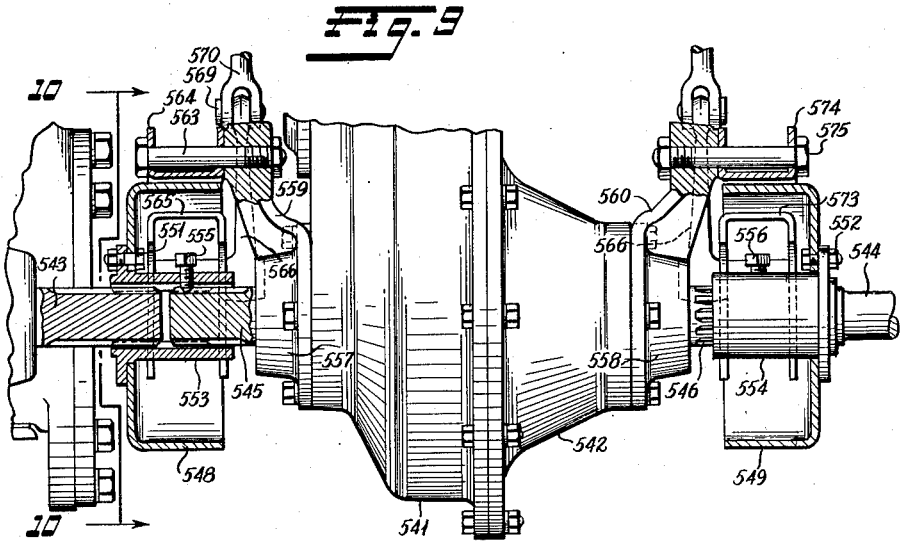
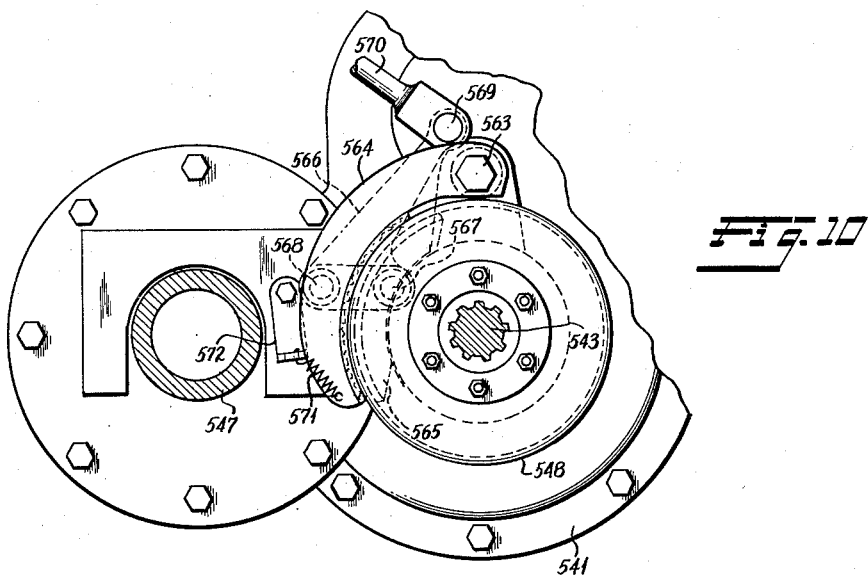

United States Patent Office 2,776,583
Patented Jan. 8, 1957

2,776,583

DRIVE MECHANISM FOR CROP HARVESTING VEHICLES

John E. Williams, Oshkosh, Wis., assignor to The Rockwell Spring and Axle Company, Coraopolis, Pa., a corporation of Pennsylvania Application April 5, 1954, Serial No. 420,960

12 Claims. (Cl. 74—701)

The present invention relates to improvements in vehicle drive mechanisms, and to vehicle drive axle mechanisms for low speed agricultural implements that are driven by normally high speed internal combustion engines, and has particular reference to the arrangement of the pulley drive, clutch, variable speed transmission, transfer gearing, differential and differential output shafts, including breaking mechanisms, for heavy duty farm combine machines.

In crop harvesting vehicles, such as combines, it is desirable that as much of the available space as possible be utilized for the many parts which perform the harvesting functions of the moving vehicle. These parts, which include the cutter bar, crop gathering reel, header conveyor, separator, elevator, grain bin, blower, engine, and the several means to drive these parts, even when efficiently and judiciously located leave only a minimum of space for gaining access to the various parts of the drive mechanism for adjustment, servicing, or replacement.

The primary object of the present invention is to provide, in a crop harvesting vehicle having a change speed transmission and a differential mechanism adjacently disposed within a common housing forming a part of a drive axle assembly, an improved housing structure and transfer gearing mounting by which it is possible to replace transfer gear sets to modify the speed ratio between the transmission output shaft and the differential as required without interference with either the transmission or the differential mechanisms.

More specifically it is an object of the present invention to provide an improved detachable brake mount whereby the foregoing object may be achieved irrespective of whether a brake mechanism is required in association with the transfer gearing.

Another object of this invention is to provide an improved unitary housing for a close coupled transmission and differential unit and novel detachable transfer means defining a driving connection between the transmission and differential unit mounted exteriorly of the housing for easy access to permit rapid replacement of the transfer unit by transfer units defining different speed ratios between the transmission and differential unit.

It is a further object of this invention to provide a vehicle drive mechanism with a unitary transmission and differential housing mounting the transmission in substantially parallel relation to axles mounted in transverse relation to the housing to permit close coupling of the transmission and differential units, with improved mounting of brake means on the transmission output shaft which are readily removable to permit easy access to transfer gearing operatively connecting the transmission and differential units.

Still another object of this invention is to provide a vehicle with novel compact transmission-differential drive means having novelly mounted, easily replaceable transfer means defining a driving connection between the transmission output shaft and the differential unit, with novelly mounted brake means associated with the transmission output shaft which is easily removable to permit easy access to the transfer means, and with improved axle outer end planetary drive means for the wheels.

A further object of this invention is to provide a new and improved arrangement of transmission, differential, and drive wheel mounting cross tube for a crop harvesting vehicle permitting improved arrangements of the crop harvesting components of such vehicles.

Further objects of the invention will become apparent as the description proceeds in connection with the accompanying drawings, wherein:

Figure 1 is a side elevational view of a combine type harvesting vehicle embodying the present invention;

Figure 2 is a plan view of the drive or transmission mechanism, differential, axle, brake drums and wheel rims of the improved drive train of one embodiment of the present invention;

Figure 3 is an end elevational view of the drive mechanism as viewed from the line 3—3 of Figure 2;

Figure 4 is a partial sectional view taken along the line 4—4 of Figure 3 showing the drive mechanism, differential and inner portions of the wheel axles;

Figure 4A is a sectional view taken substantially along the line 4—4 of Figure 3 showing only the portion of left hand wheel axle outwardly of parting line A—A of Figure 4; and Figure 5 is a partial sectional view similar to Figure 4 of a further embodiment of the transmission of the present invention and showing a removable emergency brake drum mounted on the transmission output shaft.

Figure 6 is an end elevation of another embodiment with the vehicle transmission, transfer and differential case as viewed from the left side of the vehicle, with the wheel 21 removed.

Figure 7 is a view partly in section, taken along line 7—7—7—7—7—7 of Figure 6, looking in the direction of the arrows, and showing interior details of the transmission and transfer gearing, differential gearing, housings, brake drums in phantom if used and the cross support tube.

Figure 7A is a sectional view outwardly of parting line B—B of Figure 4 taken substantially along line 7A—7A—7A of Figure 6 showing the right end of the cross support tube and the right wheel drive shaft, the axle gear reduction drive and the stub axle shaft with the drive shaft and gear reduction drive rotated 90°.

Figure 8 is a partial sectional view along line 8—8—8—8—8 of Figure 6, showing other details of the transmission;

Figure 9 is a partial vertical sectional view of an embodiment similar to Figure 7, but having a different brake arrangement; and Figure 10 is an end elevation view partly in section along line 10—10 of Figure 9.

Regerring first to Figure 1, the combine or harvester, generally indicated as 20, is supported upon leading coaxial driving wheels 21 and a pair of rear steerable wheels 22. The basic crop harvesting components of the combine are rotatable crop gathering reel 23; crop receptacle 24, upon the leading edge of which is mounted a cutter bar (not shown) and at the rear of which is located a conveyor (not shown) for transportation of the harvested crop to a separating unit; an elevator 25 for the separated grain; and a grain bin 26. The crop harvesting and vehicle movement control components of the combine are all controlled by the operator from the driver's seat 27 by the several hand wheels such as wheel 28 and operating levers in the conventional manner.

The vehicle engine or prime mover (not shown) is mounted in the frame slightly to the rear of drive wheels 21 and is preferably coupled to the vehicle drive mechanism by means of drive belt 29 (Figure 2) operatively connecting a drive pulley (not shown) mounted on the engine output shaft to driven pulley 30 mounted on input shaft 31 of the vehicle drive mechanism.

As shown in Figure 2 the drive mechanism for the vehicle is enclosed in a substantially unitary housing connected to drive axle housings 32 and 33 and essentially comprising a clutch housing defined by members 34 and 35 and transmission and differential housing 36 (Figures 2 and 3).

In operation engine driving torque is transmitted through belt 29, driven pulley 30 and input shaft 31 to a normally engaged friction clutch 37 (Figure 4) which is mounted in clutch housing 34—35 and controlled by a pedal controlled clutch actuating lever 38 (Figure 2). From the clutch 37 drive torque is transmitted to a selectively variable multi-speed transmission 39 (Figure 4) mounted in housing 36. Transfer gearing 40 (Figure 4) a portion of which is mounted on an exterior face of housing 36, the remainder within housing 36, operatively connects the transmission output shaft 41 of transmission 39 to a differential mechanism 42 (Figure 4) mounted in housing 36 in alignment with driving wheels 21 (Figure 1) and coupled to drive those wheels by axle shafts 43 and 44 (Figures 4 and 4A).

Driven pulley 30 is splined to the input shaft 31 which is rotatably mounted, by spaced antifriction bearings 45 and 46 (Figure 4) upon clutch housing member 34. Bearings 45 and 46 are held in spaced assembled relation on shaft 31 by abutting contact at their inner races with intermediately disposed tubular spacer 47 and an end of internally splined hub 48 of pulley 30 and an integral shoulder of the shaft 31, respectively. Pulley hub 48 is retained in splined driving relation on shaft 31 as by nut 49 threadedly mounted at the left hand end of the shaft 31. Bearings 45 and 46 assembled on shaft 31 are mounted and axially located in housing 34 by the abutting contact of cover 50, which is secured to the housing 34 by bolts 51, with the outer race of bearing 45 and an external snap ring 52, which is fixed to the outer race of bearing 45 as shown in Figure 4. Oil seal 58 disposed between cover member 50 and the periphery of hub 48 and a second oil seal 60 disposed between housing 34 and the inner end of shaft 31 cooperate to form a lubricant retaining chamber 61 about the bearings 45 and 46.

The clutch housing is defined by mating hollow members 34 and 35 fixed together by peripherally disposed bolts 70; member 35 also being fixed to the end wall 72 of the combined transmission-differential housing 36 by bolts 74.

Clutch output or transmission input shaft 78, rotatably mounted on spaced bearings 76 and 80 suitably mounted in aligned bores in shaft 31 and end wall 72, respectively, slidably mounts collar 84 of clutch output assembly 82 on the splined end of the shaft for coacting engagement with clutch input member 62, rigidly secured to integral flange 64 of shaft 31 by bolts 66. The clutch 37 is of the normally engaged type which may be suitably disengaged, in the well known manner, by leftward clutch disengaging movement of sleeve assembly 86 which is slidably mounted on a sleeve 87 that is fixed in coaxial relation to shaft 78. The axial sliding movements of disengagement sleeve assembly 86 along sleeve 87 is controlled by yoke 90 which is pivoted about axis 92 and in turn actuated by a foot pedal through clutch actuating lever in a manner well known to those skilled in the art. A normally plugged opening (not shown) in housing 35 permits access to grease fitting 94 in clutch sleeve assembly 86.

Shaft seal 96 disposed in a suitable bore at the inner or right hand end of sleeve 87, as viewed in Figure 4, also sealingly engages the periphery of output shaft 78 to prevent leakage therebetween. The inner race of bearing 80 is restrained axially between external snap ring 98 which is mounted in groove 100 of shaft 78 and gear 102 integral with shaft 78. The right hand free end of sleeve 87 abuts the adjacent end of the outer race of bearing 80 and also against a snap ring 99 seated in a peripheral groove in the same outer race.

Transmission output shaft 41, which is externally splined along a major portion of its length, axially slidably mounts gears 112 and 114. Shaft 41 is rotatably supported by bearings 103 and 104. Bearing 103 is mounted in a counterbore at the right hand end of shaft 78, as viewed in Figure 4, and bearing 104 is retained in the right hand end wall 106 of housing 36 by a pair of snap rings 108 mounted in abutting relation with the opposite sides of its outer race and by a snap ring 116 and an end of gear 156 abutting opposite sides of its inner race.

As is shown in Figure 4, gear 112 is provided with external gear teeth 113 and internal clutch teeth 115; both gears 112 and 114 being provided with annular peripheral shifting fork receiving grooves 120 and 122, respectively.

Countershaft 124, which is rigidly mounted at opposite ends in end wall 72 of housing 36 and housing extension 125 in spaced parallel relation to shaft 41, rotatably mounts an integral gear cluster comprising different diameter gears 126, 128 and 130 on spaced antifriction bearings 132 and 134. The outer ends of the bearings 132 and 134 abut bearing washers 136 and 138, respectively, while the inner ends abut a sleeve type spacer 140 which is mounted within the bore of the gear cluster and which serves to maintain the bearings in their proper relative axial position. Gear 126 is constantly meshed with output gear 102 on the clutch output shaft 78.

For ease of explanation and illustration, the reverse gears and shaft are shown out of position, indicated by phantom lines in Figure 4 and in its true position indicated by phantom lines in Figure 3. Reverse gear shaft 142, which is fixed in transmission housing 36 in spaced parallel relation to shafts 41 and 124, rotatably mounts a gear cluster having integral axially spaced dual reverse gears 144 and 146 on antifriction bearing 148. The opposite or outboard faces of the gears and ends of the bearings are in bearing contact with thrust rings 150 and 152, respectively, suitably secured to shaft 142 to maintain the gears in proper axial position on shaft 142. Reverse gear 144 is constantly meshed with gear 128, as is shown in Figure 4.

Referring to Figure 4, the right hand side of transmission housing 36 is provided with an external enlarged shallow recess 154 into which the right hand end of the transmission output shaft 41 extends through wall 106. The gear 156 is fixed to the end of shaft 41 within recess 154 by splines and a nut 158 threaded upon the extreme end of shaft 41.

A shaft 159 mounted in spaced parallel relation to shaft 41 and in axial alignment with shaft 124 has a central gear 160 and oppositely extending integral stub shafts 162 and 164 mounted in opposed tapered roller bearings 166 and 168, respectively, with the inner races of bearings 166 and 168 abutting the opposite hub faces of gear 160. Bearings 166 and 168 are mounted in counterbore 167 of cup shaped member 125 and a bore in the wall 106 of transmission housing 36 and are retained therein by retaining plate 174 fixed to the end wall 106 by screws 176. Spacer 178 disposed between the inner race of bearing 168 and the hub of gear 170 holds the inner race of the bearing 168 in position against a hub face of gear 160.

Transfer gear 170, in constant mesh with transmission output gear 156, is splined for rotation with transfer shaft 164 on shaft 159 and secured thereto by nut 172.

Transfer gear cover 180 is removably secured to transmission housing wall 106 in overlying spaced relation to transfer gears 156 and 170 by suitable means, such as bolts 181 in Figure 3, so that cover 180 can be easily removed to gain access to transfer gears 156 and 170. It will be readily appreciated from the foregoing description and Figure 4 that transfer gears 156 and 170 are readily accessible upon removal of cover 180 and may be removed from their respective shafts by removing nuts 158 and 172 and sliding the gears from the splined shaft ends. By virtue of this construction, the gear sets interconnecting these two shafts can be readily interchanged to selectively vary the velocity ratio between shaft 41 and rotatable gear shaft 159.

Differential cage 182 mounted in an offset portion of transmission housing 36, on an axis parallel to that of transmission output shaft 41, is rotatably supported in spaced tapered roller bearings 184 and 186. The inner race of each of the bearings 184 and 186 abuts a shoulder portion of differential cage 182. Bearing 186 is mounted as by a press fit in shouldered bore 188 of cylindrical housing insert 190 secured to end wall 72 of transmission housing 36, as by screws 192 (Figure 4) while bearing 184 is press fitted and retained by snap ring 194 in bore 195 of transmission housing wall 106. Ring gear 196, rigidly secured to the outside of differential cage 182 as by bolts or rivets, constantly meshes with gear 160.

Differential pinions 197 and 198 are rotatably mounted on the arms of spider 200 for rotation therewith and relative thereto and are constantly meshed with differential side gears 202 and 204 in driving splined engagement with axle shafts 43 and 44, respectively. Cover 210 (Figures 3 and 4) removably secured to the differential portion of housing 36 by screws 212 is provided with an oil filler plug 214. Drain plug 216, similar to plug 214, is provided in the bottom of the differential receiving portion of housing 36, as best seen in Figure 3, to provide suitable means for draining lubricant therefrom. Axle housings 32 and 33 surround in spaced relation axle shafts 43 and 44, respectively, and are fixed to opposite sides of the differential portion of housing 36 as by screws or bolts 222. Cored passages 224 and 226 (illustrated 90° out of position in Figure 4) in opposite walls of the differential portion of housing 36 allow free flow of lubricating oil from the differential portion of housing 36 into axle housings 32 and 33, respectively for lubricating the outer end axle assemblies.

Opposite cover 210, transmission housing 36 is provided with an elongated opening 228 (Figure 4) adjacent transmission gears 112 and 114. A pair of shifter forks 230 and 232 engaging shift fork grooves 120 and 122, respectively, are fixed to shift rods 234 and 236, (Figure 3) slidably mounted in cover member 238 which is removably secured, as by screws 240, to transmission housing 36 whereby it closes the elongated opening 228. Selective shifting movements are transmitted through either actuating rod 234 or 236 and its associated shifter fork to effect a selection of the transmission drive as is well known to those skilled in the art.

Turning now to Figure 4A there is shown the left hand axle assembly outboard of parting line A—A. Since the right and left axle outer end assemblies are substantially identical the description will be directed only to the left side as illustrated in Figure 4A.

The outer end of axle shaft 44 extends beyond axle housing 33 and has formed integrally thereon a sun gear 242, which floatingly supports the outboard end of axle shaft 44, as will hereinafter become apparent. Planetary housing member 244 rigidly secured to axle housing 33, as by weld 246, is provided with oil level plug 248 and drain plug 250. Oil level plug 248 is actually located slightly below the axle centerline, drain plug 250 and oil passage 251 at the bottom both being shown rotated from their actual position. Ring gear 252 mounted against shoulder 254 of housing 244 is immovably positioned in bore 256 of the housing by means of key 258 which is disposed in suitable grooves in housing 244 and the periphery of the ring gear.

Housing member 262, rigidly secured to planet housing 244 by studs and nuts 264, mounts press fitted spaced tapered roller bearings 266 and 268, the outer races of which are axially restrained by intermediately disposed integral housing shoulders 270 and 272, respectively. The outermost faces of the inner races of bearings 266 and 268 are in bearing contact with shoulder 278 and the outer end of planet gear carrier 280 as clearly seen in Figure 4A. Wheel spindle 276 rotatably mounted in bearings 266 and 268 mounts the planetary gear support or carrier 280 which has a hub portion internally splined to and retained on spindle 276 by nut 282, as clearly seen in Figure 4A. The planetary gears interconnecting ring gear 252 and sun gear 242 are rotatably journalled on flat headed pins 284 press fitted in suitable apertures in gear carrier 280 and restrained therein by snap rings 286. Oil seal 288 interposed between spindle 276 and the outer or left hand end of housing 262, as viewed in Figure 4A, prevents leakage from the planet housing to the brake mechanism.

A standard hydraulic brake mechanism, a brake shoe pivot of which is generally indicated at 290, is supported on brake backing plate 292 fixed to housing member 262 by screws 294. Brake drum 296, which encloses and forms a chamber for the brake mechanism is secured for rotation with wheel hub 298, which is an integral extension of wheel spindle 276, by screws 300. Hub 298, drum 296 and wheel rims 302 are also fixed together for rotation as a unit, by bolts 304.

Cross member 306 (Figure 4) secured to axle housing as by weld 308 is secured to housing 34 as by pin 310 for increased rigidity of the transmission and clutch housings.

In operation, power from an engine (not shown) is delivered through suitable means such as belt 29 and pulley 30 to the clutch input shaft 31 and is transmitted through the clutch assembly to clutch output (transmission input) shaft 78 and drive gear 102. Gear 102 is in constant mesh with gear 126. In order to shift the transmission to low, gear 114 is moved to the right, as viewed in Figure 4, by shifter fork 232 to engage gear 130 and thereby drive output shaft 41 through the low gear train 102, 126, 130 and 114. When the transmission is shifted to second gear, teeth 113 of gear 112 mesh with gear 128 to drive output shaft through gear train 102, 126, 128 and 112. For direct drive, gear 112 is shifted to the left so that internal clutch teeth 115 engage gear 102 forming a direct connection from shaft 78 to shaft 41. For reverse movement gear 114 is shifted to the left to mesh with gear 146 shown in phantom lines (Figure 4) so that rotation of shaft 41 is the reverse of 78 by virtue of gear train 102, 126, 128, 144, 146 and 114. Rotation of output shaft 41 is transmitted through gear train 156, 170, 160 and 196 to the differential, which functions in the conventional manner well known to those skilled in the art, to drive wheel axle shafts 43 and 44.

By virtue of the splined connections of gears 156 and 170 to their respective shafts and removable cover 180 it will be readily seen that these gears can be easily removed and replaced by gears of different ratios in order to get a different speed ratio between the output shaft 41 and the wheels, or to maintain the same ground speed when tires or wheels of sizes differing from those originally used are substituted on the vehicle.

Turning now to Figure 5, there is shown a further embodiment of the invention wherein there is a slightly different arrangement of the transmission gearing; the addition of an emergency brake on the transmission output shaft, that still permits easy access and replacement of the changeable transfer gears; and further modification which will appear as the description proceeds. Wherever possible the same reference numerals have been used to indicate identical parts shown in Figures 4 and 5. As in Figure 4, the sectional view of Figure 5 is shown somewhat out of position for purposes of clearly disclosing all the structural details.

Gear 312, having external teeth 314 and internal clutch teeth 316, and gear 318 are slidably splined to shaft 320 and are provided with shift fork grooves 322 and 324, respectively, similar to the grooves in gears 112 and 114 of Figure 4. However, it will be noted by comparison with Figure 4 that gear 312 is larger than gear 318, which is the converse of that illustrated in Figure 4. Countershaft 124' rigidly mounted in transmission housing 36' in spaced relation to shaft 320 rotatably mounts an integral gear cluster, comprising gears 126', 128', 130' similar to but arranged in a slightly different sequence from that shown in Figure 4 as will become apparent. Similarly, reverse gear shaft 142' stationarily mounted in transmission housing 36' rotatably mounts dual reverse gears 144' and 146', in a slightly different sequence from that shown in Figure 4. As seen in Figure 5, countershaft 124' and reverse gear shaft 142' are mounted and retained in housing 36' by retaining plate 326 engaging grooves in each of the shafts and secured to wall 106' by lock screw 328. As viewed in Figure 5, bearing 104' is axially located intermediate shoulder 330 of shaft 320 and the hub portion of gear 156' at its inner race and intermediately of snap rings 331 at its outer race. Oil splash ring 332 is mounted on shaft 320 intermediate output gear 156' and brake mounting hub 334, which is splined to shaft 320 and rigidly held on the shaft by nut 336. Oil seal 338 is interposed between the periphery of hub 334 and bore 340 in cover 342 which is removably secured to housing 36' by suitable means (not shown). The outer end of hub 334 extends externally or to the right, as viewed in Figure 5, of cover 342 and is provided with integral peripheral flange 344 for rigidly mounting brake drum 346, as by weld 348, of a conventional emergency brake comprising pivotally mounted inner shoe 350 and outer shoe 352. Outer shoe 352 is pivotally mounted on pin 354 rigidly mounted in integral boss 356 of cover 342, as clearly seen in the lower right hand corner of Figure 5. Inner shoe 350 and outer shoe 352 are pivotally connected at 358 and 360, respectively, to actuating crank arm assembly 362 so that actuating movements of the crank assembly can be imparted to the shoes in a manner well known to those skilled in the art. The brake shoe assembly is easily removed by merely disconnecting crank arm 362 from the actuating linkage (not shown) at pivot pin hole 364 and by removing retaining pin 366, and the brake drum is removed by removing nut 336, which will permit hub 334 to be slidably removed to the right as viewed in Figure 5 from shaft 320.

Transmission output gear 156' meshes with transfer gear 170' which is splined to shaft 164' of gear 160' and retained thereon by thrust washer 368 held in abutting contact with gear 170' as by screw 370 axially threaded into shaft 164'. The remaining portions of the transfer gearing and mechanism to the differential and axle assemblies are substantially as shown in Figures 4 and 4A.

In the operation of the embodiment shown in Figure 5 gear 312 is shifted to the right, as viewed in Figure 5, to mesh external teeth 314 with gear 130' which connects shafts 78' and 320 in low speed through gear train 102', 126', 314 and 130'. When the transmission is shifted to second gear, gear 318 is moved to the right as viewed in Figure 5 into mesh with gear 128' so that shaft 78' drives shaft 320 through gear train 102', 126', 318 and 128'. In reverse drive, gear 318 is moved into engagement with gear 146' (as shown in phantom lines in Figure 5) so that rotation of shaft 78' is reversed through gear train 102', 126', 128', 144', 146' and 318 to drive transmission output shaft 320 and finally axles 206 and 208 in a reverse direction.

Reference to Figure 5 will readily show that a novel means has been provided for mounting an emergency brake on the transmission output shaft 320 while still maintaining the novel feature of replaceable transfer gears. By merely removing a pin (not shown) from hole 364, nut 336 and pin 366 the entire emergency brake assembly permits removal of cover 342 to allow easy access to transfer gears 156' and 170', which can be easily removed and replaced to get a different speed ratio, or to maintain the same speed ratio where a different sized tire than that originally used on the vehicle is employed.

The following description relates to the embodiment shown in Figures 6–8, Figures 7, 7A and 8 of which include sectional views of the vehicle transmission, transfer and differential case.

Referring to Figure 7 a clutch input shaft 374 is journalled in a pair of spaced ball bearing assemblies 376 and 378 that are mounted in the right hand clutch housing 381. A spacer sleeve 382 on shaft 374 separates the bearing assemblies 377 and 378, the bearing assembly 378 being retained within a pair of housing end plates 383 and 384 that are secured to the right end of housing 381 by bolts or the like, not shown. Splined to the right end portion of input shaft 374 and secured thereto as by a nut 385, is a V belt pulley 386 which is driven from the engine (not shown) by a V belt 387.

The left end portion of shaft 374 has a flange 388 to which is secured as by bolts 389, the input portion 391 of the clutch assembly which includes a clutch output shaft 392 which is journalled at its reduced diameter right end 393 in a ball bearing assembly 394 mounted in a cylindrical recess in the center of the left end of clutch input shaft 374. Adjacent its left end the clutch output shaft 392 is journalled in a bearing 395 mounted in an opening in a right wall 396 of a transmission case 412. A left hand clutch housing 397 is secured to the transmission case wall 396 as by bolts or cap screws 398. The left hand clutch housing 397 has fixed to it an inwardly protruding cylindrical extension 399 upon which is axially slidably mounted a clutch disengagement sleeve 400. The shaft 392 is provided with a helical groove 402 which, due to the direction of its inclination relative to the direction of rotation of the shaft, prevents transmission oil from entering the clutch housing.

The clutch is a conventional normally engaged friction disc type. Its output or driven disk member 404 is splined to shaft 392 at 405 for free axial movement thereon. A clutch disengagement lever 406 mounted on pivot shaft 407 is actuated by the vehicle operator to move the clutch disengagement sleeve 400 to the right until a clutch release bearing 408 engages elements 409 to disengage the clutch in the conventional manner.

The transmission case 412 also has a left wall 413 in which is mounted a bearing 414 for the left end of a transmission output shaft 415, the right end of which is journalled in a bearing 416 mounted in a counterbore in the left end of the clutch output shaft 392, which shaft end also includes an integral gear 417 which provides a transmission input gear. On the outside of the transmission case left wall 413 is a transmission output or primary transfer gear 418 that is removably secured to the protruding end of shaft 415 by a key 419 and a nut 420. The shaft 415 is externally splined and has slidably splined thereto a pair of gears 423 and 424. The gear 423 has a groove 425 (Figure 8) to receive a shifter fork 426 (Figure 7) and similarly gear 424 has a groove 427 to receive a shifter fork 428, the shifter forks being each mounted upon shift rods and actuated by a conventional shifting assembly 430 under the control of the vehicle operator, to engage or disengage the gears on a gear cluster 429 on a counter-shaft 431 (Figure 8) which is parallel to shaft 415 and non-rotatably secured in the right and left walls 396 and 413 of the transmission case 412.

The gear cluster 429 comprises a cylinder 432 journalled for rotation on countershaft 431 by a pair of spaced bearings 433 and 434 separated by a spacer 435. Integral with the cylinder 432 is a gear 436 and a spaced gear 437 that is in constant engagement with a reverse gear 438 rotatably mounted on a fixed shaft 441. Also forming a part of the gear cluster 429 are a pair of gears 442 and 443, mounted on cylinder 432 and keyed to it by a single key 444, so that all four gears 437, 436, 442 and 443 rotate continuously as a unit so long as the friction clutch is engaged, the said gear 443 being in constant driven engagement with the transmission input gear 417 on the left end of shaft 392.

Direct drive of transmission output shaft 415 is obtained by movement of the shifting assembly 430 and shifter fork 428 to shift gear 424 to the right, in which position its internal gear teeth or splines 445 engage reduced teeth or splines 446 on the left of gear 417 on the clutch output shaft 392 in a toothed clutch drive connection. For second high gear the same gear 424 is shifted to the left by shifter fork 428 so as to engage gear 442 on counter-shaft 431. Low gear is obtained by moving shifter fork 426 to the right so as to engage gear 423 with the gear 436 on the counter-shaft. Reverse is obtained by moving the same gear 423 to the left so as to engage the adjacent portion of the wide reverse gear 438, which is continuously driven by the gear 437 on the counter-shaft 431.

Referring again to Figure 7, a transfer shaft 447 is journalled in bearings 448 and 449 in the transmission housing left and right walls 413 and 396. A grease retainer 452 adjacent bearing 449 holds transmission lubricant in the housing 412. The left end of the transfer shaft 447 protrudes through the housing left wall 413 and has a transfer gear 453 removably secured to it by a key 454 and a nut 455.

A removable dished cover plate 456 covers the primary transfer gears 418 and 453 and is secured to the transmission housing left wall 413 as by cap screws 457. When it is desired to change the speed ratio between transmission output shaft 413 and transfer shaft 447 it is merely necessary to remove cover plate 456 and substitute the desired gears for the gears 418 and 453. Thus it is easy to change the gears to compensate for tire or wheel changes or for changes in the type of work for which the vehicle is to be used.

The right wall 396 of the transmission case 412 has an extension and the left-hand clutch housing 397 has an extension 397a (downward extension as viewed in Figure 7) the clutch housing 397 also having an integral spaced wall 397b which mounts a right bearing 461 for a rotatable idler differential input shaft 462, the left end of shaft 462 being mounted in a left bearing 463 in the left housing extension 397a.

The shaft 462 has external splines 464. The right end of transfer shaft 447 has splined thereto a gear 465 that drives a gear 466 splined to the shaft 462. A smaller gear 467 is also splined to the shaft 462 and drives a ring gear 468 of a differential indicated generally at 471.

The left section 397c of the differential housing may be a continuation of the left hand clutch housing extension 397a. The right section 472 of the differential housing is secured to left section 397c as by bolts 473 and to the housing extension 397b by cap screws or the like, not shown. Within the differential housing the differential 471 has a two piece casing comprising a right casing 474 secured to a left casing 475 by cap screws 476 to form a rigid unit. The right end of differential 471 is journalled in a bearing 477 mounted in the right housing section 472 and the left end is journalled in a bearing 478 in housing section 397c, these bearings being retained against shoulders on differential 471 by cover plates 481 and 482 respectively, that are secured to the housing sections by cap screws, not shown.

A left side gear connected stub shaft 483 is journalled in a bearing 484 which is retained against a shoulder in cover plate 482 by a snap ring 485. A second snap ring 486 received in a groove in the stub shaft 483, abuts one side of the inner race of bearing 484, the other side of the race abutting an integral shoulder on the stub shaft, so that the said stub shaft 483 is effectively locked to the inner race of the bearing. The right end of the stub shaft 483 is splined to a side gear 487 of the differential. The left end of the stub shaft 483 is splined for engagement with an internally splined sleeve 488 which may have affixed to it, as by welding, a brake drum 489. The internally splined sleeve 488 also receives the splined right end of a left axle reduction gearing input shaft 491 that drives the left wheel 21 (Figure 1) of the vehicle through a reduction gear in housing 492 and 493 in a manner which will be completely described with the wheel drive for the other (right) side of the vehicle. The axial position of sleeve 488 is fixed by a set screw 494. Thus shaft 491 may be uncoupled from shaft 483 by loosening screw 494 and sliding the sleeve 488 to the left until it is disengaged from the splines on shaft 483.

The drive wheels 21 (Figure 1) of the vehicle are not coaxial with the stub shafts protruding from the differential 471 but are journalled on the outer ends of a cross tube 495 that is forward of but substantially in the same horizontal plane as the axis of the differential 471. This is more clearly apparent from Figure 7A.

Referring now to Figure 7A and to the lower right portion of Figure 7, a right hand side gear connected stub shaft 496 is mounted in and secured to a bearing 497 mounted in the cover plate 481, and splined to the other differential side gear (not shown) in the same manner as the left hand stub shaft 483. Also, an internally splined sleeve 498 which may have affixed thereto a brake drum 499 is secured to the right splined end of stub shaft 496 by a set screw 500. A right hand connecting shaft 503 is enlarged at its left end and splined to sleeve 498.

Referring now solely to Figure 7A the right end of cross tube 495 is flared to form a radial flange 504 to which is secured as by bolts 505 and cap screws 502 a housing 510 that rotatably supports, by spaced bearings 506 and 507 a stub axle shaft 508, the outer end of which shaft terminates in a radial flange 509 to which is secured in a conventional manner a driving wheel such as 21 of Figure 1. A driven gear 512 is splined to the stub axle shaft 508 and axially located by a shoulder 513 and a snap ring 514. The cross tube is attached to the vehicle and supports it by any of the means familiar to the art, as shown for example in application Serial No. 175,146, filed July 21, 1950, by B. W. Keese et al., for Drive Mechanism.

The inner race of bearing 507 abuts a spacer ring 515 which in turn abuts the radial flange 509 of stub axle shaft 508, and a snap ring 516 abuts the outer bearing 507 race to retain the bearing 507 against the spacer ring 515. The outer race of the bearing 506 abuts a snap ring 517, the bearing 506 being tightened snugly against the snap ring 517 and the entire stub shaft 508 being retained within the housing 510 by an axial cap screw 518 thread into the left end of stub shaft 508, there being a washer 519 between screw 518 and the end of shaft 508 and having a pin 521 seated in a hole in the end of the shaft to prevent relative rotation of the washer 519. A cover plate 522 secured by cap screws 523 covers the entire opening in housing 510 that receives bearing 506 and shaft 508, thereby preventing the passage of oil into the cross tube 495. The lower portion of the housing 510 is closed by a removable enclosure 524 secured as by cap screws 525 and having a lubricant drain plug 526.

The rear end of the housing 510, or the top end as viewed in Figure 7A has coaxial bores that mount roller thrust bearings 527 and 528 which rotatably journal a right hand axle reduction gearing input shaft 529 which includes an integral pinion gear 532 that drives the driven gear 512 on stub axle shaft 508. The inner races of bearings 527 and 528 abut shoulders on shaft 529 on opposite sides of integral gear 532. The outer race of bearing 527 is held by a snap ring 533 and the outer race of bearing 528 abuts a shoulder on cover plate 534 that is piloted in the bore in housing 510 and removably secured by screws 535. The opening into which cover plate 534 is piloted is large enough so that the shaft 529 and integral gear 532, with the bearings 527 and 528 may be removed through the opening when the cover plate 534 is removed. Shims 536 beneath the cover plate provide for adjustment.

The right end of connecting shaft 503 is enlarged and splined to fit into internally splined sleeve 537, and the left end of shaft 529 is splined to fit into the same sleeve, thus connecting shaft 503 to shaft 529. The sleeve 537 is held axially in place by a removable pin 538 passing through the sleeve and between the adjacent ends of the shafts.

It will be noted that the arrangement with the cross tub 495 in front of the differential 471 and associated shafts 483, 491, 496, 503 and 529 the cross tube provides a protective bumper for these elements against brush, stumps, etc. when the vehicle is moving forward.

A different embodiment of brake supporting means is shown in Figures 9 and 10. The split differential housing is indicated at 541 and 542, the left axle reduction gearing input shaft at 543, the right hand connecting shaft at 544, the differential output left and right hand stub shafts at 545 and 546 and the cross tube at 547, all of these parts and their associated elements being similar to those shown in the embodiment of Figure 7. The brake drums 548 and 549 however, have their open ends facing the differential and are secured as by series of bolts 551 and 552 respectively, to the outer ends of the internally splined sleeves 553 and 554, which, as in the embodiment of Figure 7, are secured to splined stub shafts 545 and 546 by set screws 555 and 556.

The cover plates 557 and 558 are similar to those of Figure 7 except that they have integral brake supporting arms 559 and 560. Arm 559 supports an outer brake shoe pivot pin 563 upon which is pivoted an outer brake shoe 564. An inner brake shoe 565 is pivotally connected at 567 with a brake actuating crank 566 that is also pivotally connected at 568 with the outer brake shoe 564. The other end of the crank 566 is connected by a pivot 569 to a brake rod 570 controlled by the vehicle operator. Both inner and outer brake shoes are retracted by a tension spring 571 connected to the outer shoe 564 and to a fixed support 572. The inner and outer shoes 573 and 574 associated with the pivot pin 575 on the other side of the differential operate in the same manner. It will be apparent that with the embodiment illustrated in Figures 9 and 10 the splined sleeves 553 and 554 may be slid outwardly after setting screws 555 and 556 are loosened, without dismantling any of the brake assembly.

From the foregoing it will be seen that there has been provided a novel vehicle drive mechanism having three forward speeds and a reverse speed with novel replaceable transfer gear means for varying the speed ratios from the transmission output shaft to the axles. Additionally this invention provides novel means for attaching an emergency brake to the transmission output shaft that still permits easy access to a replaceable transfer gear train on the output shaft. This feature provides a novel, simple, and inexpensive vehicle drive mechanism particularly adaptable to low speed agricultural vehicles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, housing structure, a change speed transmission mounted in one portion of said housing structure and having an output shaft projecting through a wall of said housing structure, a differential mechanism mounted in a second portion of said housing structure, a second shaft rotatably mounted in said housing structure in spaced parallel relation to said output shaft, said second shaft being drive connected to said differential mechanism internally of said housing structure and projecting through a wall of said housing structure adjacent the projecting end of said output shaft, a pair of meshed gears each detachably fixed for rotation with the projecting ends of one of said shafts externally of said housing structure wall, and a detachable cover fixed to said housing structure over said pair of gears.

2. A vehicle drive mechanism adapted to permit modification of the speed ratio between the transmission mechanism output shaft and the differential mechanism without interference with either of such mechanisms, said drive mechanism comprising a combined transmission and differential housing having axially aligned wheel drive shafts projecting from opposite sides thereof, a differential mechanism in said housing operatively interposed between the adjacent ends of said wheel drive shafts; a change speed transmission mechanism mounted in said housing; means forming a chamber distinct from the interior of said housing and defined partially by an exterior wall of said housing and a cooperating cover detachably secured to said housing; a transmission output shaft having one end extending from the interior of said housing into said chamber; a differential power input shaft extending from the interior of said housing into said chamber; and meshed transfer gears detachably connected to said output and input shafts to form a driving connection from said transmission to said differential mechanism whereby said meshed transfer gears can be replaced to vary the speed ratio of the transmission output to the differential without interference with either.

3. A vehicle drive mechanism adapted to permit modification of the speed ratio between the transmission mechanism output shaft and the differential mechanism without interference with either of such mechanisms, said drive mechanism comprising a combined differential and transmission housing having oppositely extending coaxial hollow axle arms secured to opposite sides thereof; an axle shaft rotatably mounted in each of said axle arms; differential mechanism in said housing operatively interposed between the adjacent ends of said axle shafts; a change speed transmission in said housing having an output shaft extending exteriorly of said housing; detachable transfer means defining a close coupled operative connection between said shafts exteriorly of said housing whereby driving torque from said transmission can be transmitted to said drive axles; and separable means defining a chamber exteriorly of said housing enveloping said transfer means, one of said shafts extending through said chamber and having a terminal outside said chamber, and coacting brake components detachably secured on said shaft terminal and said housing.

4. In a driving mechanism adapted to drive a vehicle at a slow speed from a prime mover normally operating at a relatively high speed; a disengageable clutch having means for connection to the prime mover; a change speed transmission driven by said clutch and having an output shaft; a wheel driving differential having an input gear; a transfer shaft between said transmission output shaft and said differential gear to drivingly connect the two; all of said shafts and said gear all having substantially parallel axes; a driving gear on said transmission output shaft; a driven gear on said transfer shaft; means for facilitating removal of said driving and driven gears whereby they can be replaced by gears of different sizes to change the gear ratio; a separate removable cover for said gears; and means to drive said differential input gear from said transfer shaft.

5. In the device described in claim 4, a brake drum mounted on said transmission output shaft; and brake shoe means for frictionally engaging said drum.

6. In the device described in claim 4, an idler shaft between said transfer shaft and said differential input gear, driven by said transfer shaft and driving said differential input gear.

7. In the device described in claim 4, an idler shaft between said transfer shaft and said differential input gear driven by said transfer shaft and driving said differential input gear; and a gear on said transfer shaft meshed with said differentail input gear providing a speed reduction drive therebetween.

8. In the device described in claim 4, an idler shaft between said transfer shaft and said differential input gear, driven by said transfer shaft and driving said differential input gear; and a gear on said transfer shaft meshed with said differential input gear providing a speed reduction drive therebetween, said shafts and differential input gear having parallel axes and all of said gears being spur gears.

9. In a vehicle drive, a variable speed transmission having an input shaft adapted to be connected to a prime mover, a drive axle assembly comprising differential mechanism, means comprising two spaced paralell shafts operably connecting the output of said transmission and said drive axle assembly, and a pair of constantly meshed gears removably mounted on adjacent ends of said shafts, said pair of gears being accessible for substitution of another pair of gears of different size to provide a desired speed ratio between said shafts to suit a particular vehicle operating condition.

10. In the vehicle defined in claim 9, housing structure enclosing said transmission and shafts, said housing structure having a detachable wall portion extending over said gears and removable for access to change said gears.

11. In a vehicle drive, a variable speed transmission having an input shaft adapted to be connected to a prime mover and an output shaft, an axle assembly comprising differential mechanism, means drive connecting said transmission output shaft and the differential mechanism including a transfer shaft parallel to said transmission output shaft, said shafts having adajcent ends, and normally constantly meshed pair of gears removably mounted on said shaft ends whereby said pair of gears may be replaced by another pair of gears for readily changing the drive speed ratio between said transmission output shaft and the differential mechanism to suit different vehicle operating conditions.

12. In a driving mechanism adapted to drive a vehicle at slow speed from a prime mover normally operating at a relatively high speed; vehicle drive wheels; a support for the drive wheels arranged transversely of the vehicle; a differential rearward of said support and connected to drive said wheels; a change speed transmission rearward of said differential and connected to drive said differential; a prime mover clutch coaxial with the input shaft of said transmission; a gear box on each end of said drive wheel support, each including a relatively rotatable stub axle shaft for a wheel, and input and driving gears for said stub axle shafts; drive shafts rearward of said support and connecting said differential to said input gears; disconnect means in each of said drive shafts to separately disconnect the differential from each wheel; each said drive shaft including two coaxial portions externally splined at their adjacent ends and an internally splined sleeve connecting said splined shaft portions, and each said internally splined sleeve having an integral brake drum and brake shoe means engageable with said drum for braking the vehicle, each said brake drum having its open end facing said differential, and said brake shoe means being supported by said differential, whereby said splined sleeves and integral drums can be moved outwardly away from said differential without affecting the adjustment of said brake shoes.

References Cited in the file of this patent

UNITED STATES PATENTS

| | | |
|---|---|---|
| 1,279,575 | Morris | Sept. 24, 1918 |
| 1,279,671 | Denning | Sept. 24, 1918 |
| 1,490,374 | Foote | Apr. 15, 1924 |
| 1,490,375 | Foote | Apr. 15, 1924 |
| 1,652,699 | Church | Dec. 13, 1927 |
| 2,183,514 | Granberg et al. | Dec. 12, 1939 |
| 2,393,557 | Orshansky | Jan. 22, 1946 |